Patented Dec. 10, 1935

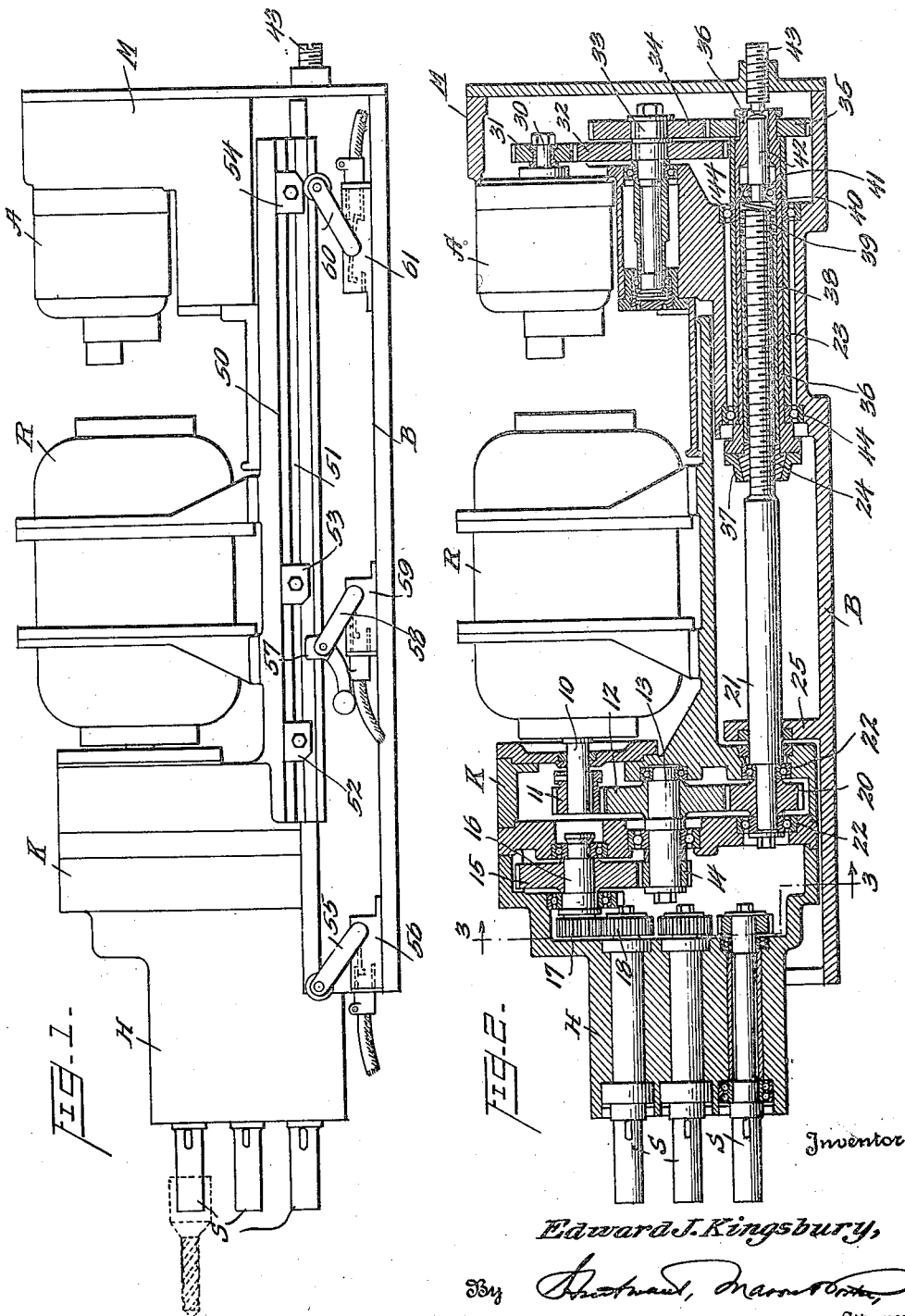

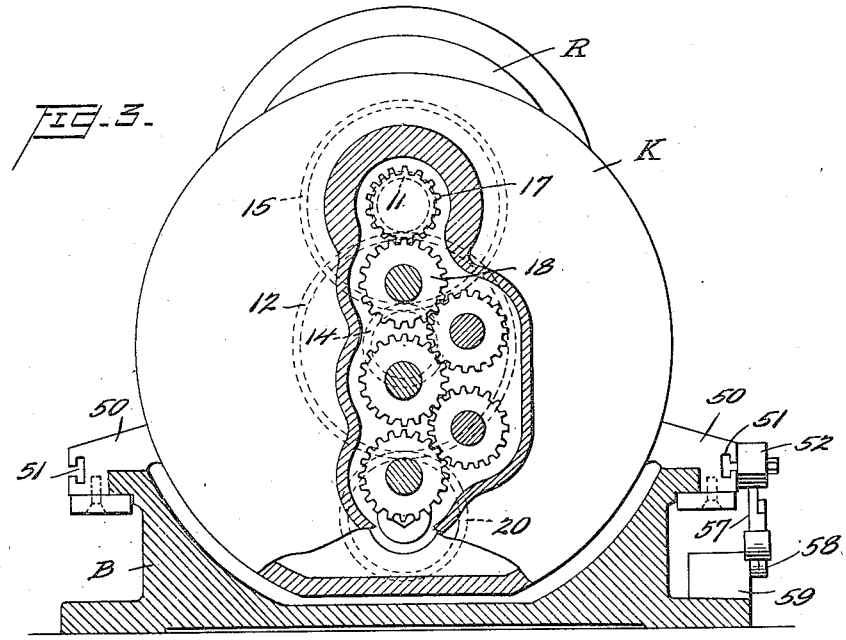
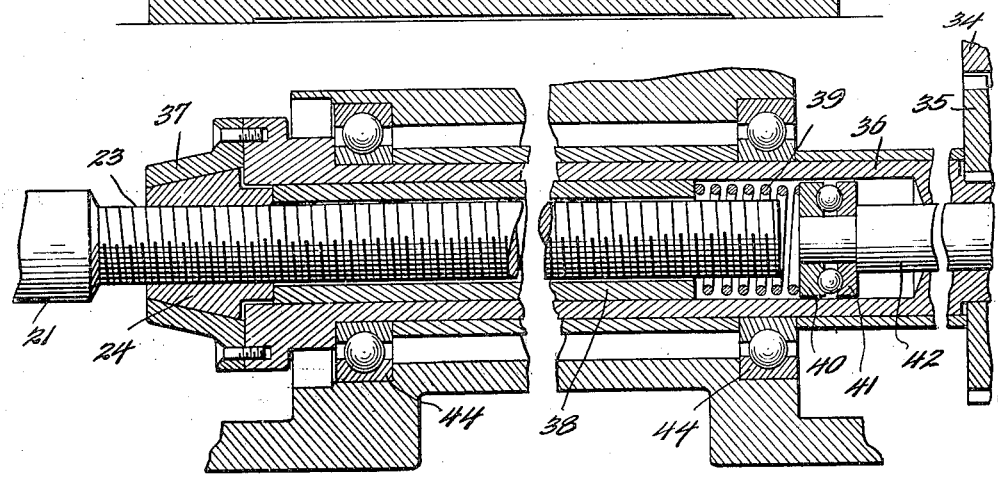

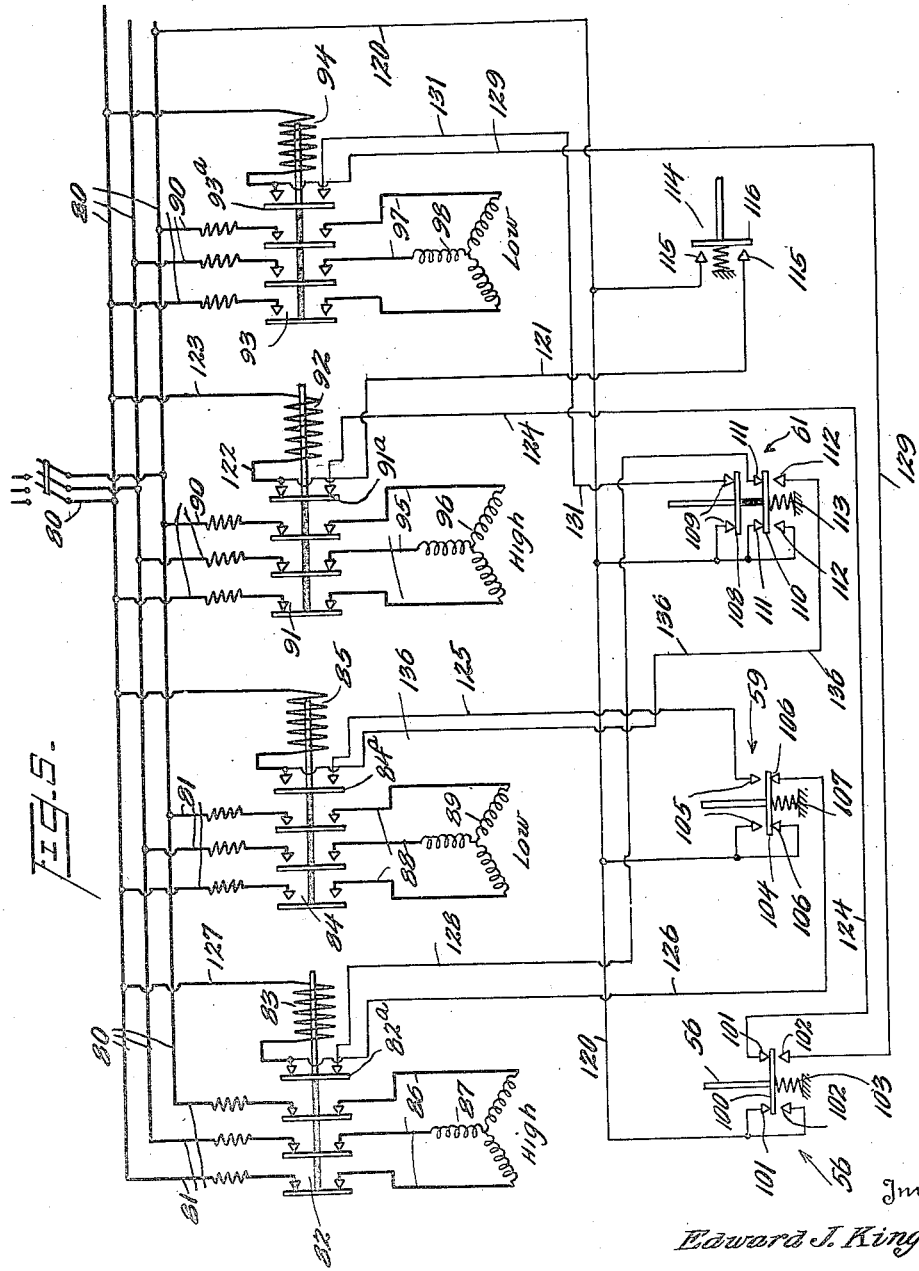

2,023,841

UNITED STATES PATENT OFFICE 2,023,841

TWO-MOTOR CONTROL FOR SCREW FEED MACHINE TOOL UNITS

Edward Joslin Kingsbury, Keene, N. H.

Application July 11, 1932, Serial No. 621,966

20 Claims. (Cl. 77—32)

This invention relates to improvements in feeds for machine tool units, and more particularly concerns a screw feed unit in which two motors are employed for obtaining different feeding speeds.

One of the features of the present invention is the provision of means for controlling the speeds of two motors whereby three or more different feeding speeds may be attained.

Another feature of the invention is the provision of a feeding mechanism employing two constantly rotating motors, which are operated at different speeds, but always in the same direction, for obtaining various feeds of the tool.

Another feature of the present invention is the provision of means whereby the main driving motor may be employed in conjunction with an auxiliary feed motor for obtaining varying feeds, by controlling the relative speeds of the two motors.

Further features of the invention will appear in the course of the following specification and claims, in which an illustrative form of construction of the device is shown, and in which:

Figure 1 is a side elevation of a machine and tool unit according to the present invention.

Figure 2 is a vertical longitudinal section through the same.

Figure 3 is a transverse vertical section, on a larger scale, substantially on line 3—3 of Figure 2.

Figure 4 is a vertical longitudinal section, on a larger scale than that of Figure 2, showing the nut and screw feed elements.

Figure 5 is a circuit diagram of the manner of connecting the motors.

In these drawings, the machine tool unit is illustrated as having a base B having a fixed bracket M extending therefrom to support an auxiliary feed motor A having a horizontal shaft. A sliding tool head K has a platform for supporting the main motor R and is provided with a head H from which tool spindles S project. Feeding is accomplished by the relative sliding movement of the tool structure K and motor R with respect to the base B, the feeding of the tool to the work occuring by a movement toward the left in Figures 1 and 2, and the return of the tool from the work being accomplished from the left toward the right in these figures.

The main motor R (Figure 2) has a horizontal shaft 10 provided with a small gear 11 which is in mesh with a large gear 12 carried by an auxiliary shaft 13 having a small gear 14 in mesh with a large gear 15 on a tool driving shaft 16 having a gear 17 in mesh with a tool gear 18 mounted on a tool spindle S. Similar driving gears are provided, but not shown, in the usual way for driving the other tool spindles S.

The large gear 12 is likewise in mesh with a gear 20 mounted on a spindle 21 carried by bearings 22 in the head K and including at its rear end a right-hand threaded portion 23 which engages with an internally threaded and externally conical nut 24. This spindle 21 extends through an upwardly projecting bracket 25 of the bed B so that the smooth portion of the spindle is journaled therein during movement of the tool carrying portion K with respect to the bed B as aforesaid.

The auxiliary motor A has its horizontal shaft 30 provided with a gear 31 meshing with a gear 32 on an idler shaft 33 journaled in an upstanding portion of the base B. A second gear 34 on the idler shaft 33 is in mesh with a nut driving gear 35 fixed on a hollow shaft 36 which extends forwardly surrounding and in telescoping relationship with the threaded portion 23 of the spindle 21, and provided at its front with an internally conical collar 37 which fits the external conical surface of the nut 24 (Figure 4). A plunger sleeve 38 is slidable over the threaded portion 23 and within the hollow shaft 36, being urged constantly toward the left in Figure 2 by a coil spring 39 which reacts against one race 40 of a ball-bearing having a second race 41 mounted around a reduced end of an adjusting pin 42, which as indicated in Figure 2 may move axially by the adjusting screw 43. The hollow shaft 36 is carried by ball-bearings 44 in the bed B.

Laterally projecting (Figures 1 and 3) from the tool structure K is a skirt 50 having a T-groove 51 in which may be adjusted and clamped the three dogs 52, 53 and 54.

Dog 52 cooperates, at the end of the forward feeding movement of the tool structure, with a switch arm 55 of spring switch 56. Dog 53 cooperates during the forward feeding movement at a point corresponding to a close approximation of the tool to the work, on a gravity-held pivoted finger 57 of a switch arm 58 of spring switch 59. Dog 54 cooperates at the end of the rearward or withdrawal feeding movement with the arm 60 of a spring switch 61.

These switches 56, 59, and 61 are connected to the main motor R and to the auxiliary motor A in any desired manner for the purpose of accomplishing the differential speed control of these motors in proper sequence.

An illustrative manner of connecting these switches and motors is shown in Fig. 5 where a three-phase source connected to switch terminals and main conductors 80 is joined by the branch phase conductors 81 to contacts of the two three-pole "high" speed switches 82 which may be closed by a solenoid 83, and to the contacts of the three-pole "low" speed switch 84 which may be closed by the solenoid 85. Phase conductors 86 lead from the switch 83 to the "high" speed windings 87 of the large motor R, while phase conductors 88 lead from the switch 84 to the "low" speed windings 89 of this large motor R.

The branch phase conductors 90 similarly lead to the three-pole "high" speed switch 91 which may be closed by a solenoid 92 and to a three-pole "low" speed switch 93 which may be closed by the solenoid 94. Phase conductors 95 lead from switch 91 to "high" speed winding 96 of the auxiliary motor A; while conductors 97 lead from switch 93 to the "low" speed winding 98 of this auxiliary motor A.

The switch 56 includes a bridge 100 normally engaging upper contacts 101 and movable by dog 52 to close lower contacts 102, this switch being opened again by a spring 103 when the dog leaves the arm 55.

The switch 59 similarly includes a bridge 104 for normally closing the upper contacts 105, and being actuated by the dog 53 to close lower contacts 106, and being opened again by spring 107 when the dog 53 no longer depresses the pawl 57 and arm 58 as aforesaid.

The switch 61 includes two mutually insulated bridges, of which the upper bridge 108 normally closes contacts 109, while the lower bridge 110 normally closes contacts 111. Upon actuation of the switch by the dog 54, these normally closed contacts are opened and the lower bridge 110 may close a circuit through the lower contacts 112. When the dog 54 leaves arm 60, the parts of switch 61 are moved to the upper position (shown in full lines in Figure 5) by a return spring 113.

A hand-starting switch 114 may be manually operated to momentarily close contacts 115 by a bridge 116. The closure of the hand-starting switch 114 establishes a circuit from the right-hand main conductor 80 by bus conductor 120 to one contact 115, through the bridge 116 to the other contact 115, and by conductor 121 to contacts at switch 91, and thence by a switch bridge 91a and conductor 122, solenoid 92 and conductor 123 back by the lower branch conductor 90 to the left-hand main conductor 80. The energization of solenoid 92 thus produced causes a closure of switch 91 so that current may flow through conductors 90, 95 and energize the high speed winding 96 of the auxiliary motor A. As the switch closes, its bridge 91a opens the circuit through conductor 121 and establishes a circuit closing relationship with conductor 124, this being supplied with current from bus conductor 120, through the normally closed contacts 101 of switch 56. The auxiliary motor thus begins to run at high speed.

Meanwhile it will be understood that the main motor R is being supplied with current through switch 84 which has been closed by current flowing from the bus conductor 120 to the lower contacts 112 of switch 61 when closed, by conductor 136 to the switch contacts and bridge 84a and thence through the solenoid 85 back to a main conductor 80; and is held closed by a similar circuit through the upper contacts 105 of switch 59, conductor 125, the other contacts of switch 84, and its bridge 84a, so that motor R is moving at low speed.

If switch 59 is now depressed, the current which has been flowing through the closed contacts 105 and conductor 125 is now broken so that switch 84 immediately opens. The movement of the switch 59 likewise closes a circuit from bus conductor 120 through the closed contacts 106 and conductor 126 which is in circuit closing relationship with contacts and bridge 82a of switch 82 so that solenoid 83 is energized with a return of the current by conductor 127 to the left-hand main conductor 80. The "high" speed switch 82 is thus closed and the "high" speed winding 87 of the main motor R is energized. As the switch 82 closes, its bridge 82a opens the circuit through conductor 126 and establishes a circuit by conductor 128 which is being supplied with current through the closed contacts 111 of switch 61 from the bus conductor 120, thus creating a "holding" circuit for solenoid 83.

When switch 56 is depressed, the holding circuit from bus conductor 120 and contacts 101 by conductor 124 to bridge 91a is opened, and solenoid 92 is de-energized so that switch 91 opens. The same movement of switch 56 closes contacts 102 so that a circuit is established from bus conductor 120 by conductor 129 to the bridge 93a of switch 93 and thence through solenoid 94 and conductor 103 back to the left-hand main conductor 80. This energizes the solenoid 94, closes switch 93 and energizes the "low" speed winding 98 of the auxiliary motor A. The movement of the switch 93 opens the circuit at bridge 93a with respect to conductor 129 and establishes a holding circuit by conductor 131 and the contacts 109 of switch 61.

When switch 61 is depressed, the holding circuit through contacts 109 and conductor 131 is opened, so that solenoid 94 is de-energized, and the auxiliary motor A comes to a standstill. The holding circuit through contacts 111 and conductor 128 is opened, and solenoid 83 is de-energized, and the main motor R passes from "high" speed. The movement of switch 61 however also closes a circuit through contacts 112 and conductor 136 which energizes solenoid 85 and closes the "low" speed switch 84 for the main motor, which upon movement displaces its bridge 84a to establish a holding circuit by conductor 125 and contacts 105 of switch 59. The parts have now returned to the initial position, with auxiliary motor A at a standstill, ready to be started again by closing the hand-starting switch 114.

The invention will now be illustratively described as operating with the motors operating at 1800 and 900 R. P. M., which are speeds (disregarding slip) easily attainable with 60 cycle alternating current motors.

In operation, the motors are connected to a source of current by closing the main switch to main conductors 80. When the tools are entirely withdrawn from the work, the tool structure K is in its right-hand position (Figures 1 and 2) and dog 54 has moved switch lever 60 to bring the auxiliary motor A to a standstill. The switch 61 has likewise been operated to bring the main motor R to a speed of 900 R. P. M. so that this motor acts through gears 11—12—20 to drive spindle 21 and at a speed of 450 R. P. M. Owing to the threading of the portion 23 of spindle 21, it tends to force the nut 24 toward the left, and the nut 24 is drawn, with the assistance of the spring 39, into tight contact with collar 37: and motor R may drive the auxiliary motor A, which latter is now disconnected from the source.

To start a cycle, the operator presses a button 114, which causes a flow of current through the "high" speed windings of the auxiliary motor A which brings the motor to a speed of 1800 R. P. M. This motor now drives the hollow shaft 36 through the gears 31—32, 34—35 at a speed of say 920 R. P. M. This movement of the hollow shaft 36 is transmitted to collar 37, and the latter now turns at a speed greater than the speed of the threaded portion 23 of spindle 21, and in the same direction therewith. The collar 37 therefore engages the nut 24 and causes the latter to turn and produce a feeding movement of the spindle so that the latter is moved toward the left in Figures 1, 2, and 4. This movement is determined by the pitch of the threaded portion 23 and by the speeds and gear ratios. The spindle 21 is revolving at 450 R. P. M., and the nut 24 is revolving at 920 R. P. M., so that the relative rotation of the two parts as they travel in the same angular direction is 470 R. P. M.: and with the five-pitch screw 23, there is a rapid forward initial feeding of the tools at a speed of 94 inches per minute.

As soon as the dog 53 encounters the pawl 57, it operates switch 59 to effect delivery of current to the main motor R, so that the latter is now driven at 1800 R. P. M., and thus through the gears in head K causes the tools to be driven at maximum speed as determined by other driving gears, and causes also a rotation of spindle 21 in the same direction as before, but at 900 R. P. M. The auxiliary motor A continues to move at a speed of 1800 R. P. M. and the hollow shaft 37 and nut 24 are rotated at 920 R. P. M. The differential in the two speeds is now 20 R. P. M., so that the tools are fed forward, while revolving at their own high speed, with a feed of four inches per minute. This speed may be varied as desired by exchanging gears 31, 32, 34, and 36 for other gears to determine this ratio, but in each instance it is necessary that the hollow shaft 36 be driven by auxiliary motor A at a speed higher than 900 R. P. M. in this illustrative example of construction.

The tools now operate upon the work until the dog 52 encounters switch lever 55 and actuates switch 56 to open the circuit which has been supplying the auxiliary motor windings with current for driving it at 1800 R. P. M. and to connect the auxiliary motor A for rotation at 900 R. P. M. The hollow shaft 36 and nut 24 are then revolved at a speed of 460 R. P. M. and still in the same direction as the movement of the spindle 21. The relative speeds of the nut 24 and the screw 23 is then 440 R. P. M., so that the spindle in overrunning the nut 24 produces a positive return or withdrawal of the tools from the work while the tools are still revolving at their own high rate of speed, this return or backward feed occurring in the illustrative example at the rate of 88 inches per minute.

As the dog 53 encounters the pawl 37, it rocks this pawl but does not actuate the switch lever 58 or switch 59.

Ultimately, the dog 54 encounters the switch lever 60 and actuates switch 61 as described above, but de-energizes the auxiliary motor A, and brings the main motor R to a speed of 900 R. P. M.

It will be noted particularly that the driving of the tools while engaged with the work is accomplished at the higher speed of the main motor R and that, while the machine is idling between operations, this motor is turning at low speed. The initial energization by closing button 114 merely produces a starting pulse of current through the small auxiliary motor A. At the changing of speeds accomplished by switch 59, the larger motor is building up speed, but since this larger motor is not then engaged in driving the tools, the total demand on the line is not severe. It is thus apparent that the heavy current normally required for starting motors is offset by having the main motor R always revolving and thus developing a counter-electromotive source to prevent starting surges.

During the rapid initial forward feeding, motor R is running at low speed and the motor A is running at high speed, but under compartively light loads as there is no substantial opposition to this initial feeding. When the motor R changes to high speed by the action of switch 59, to produce the fine feed, there still is a slight opposition to movement and the motor is running substantially at the theoretical 1800 R. P. M. When the tools engage the work, the additional load tends to cause the two motors to slow down and the amount of slippage in the motors thus engendered will vary with the load. The motor A tends to revolve the end at too great a speed and hence to force the tools forward with too great a feed. The extra resistance, however, tends to slow this motor A so that the nominal feed is afforded, as controlled by change gears 31 to 36. The difference in speeds of the motors at different slippage thus counterbalances itself. In order to protect the tools against excessive feed even under such conditions, the screw 43 may be adjusted to give a proper amount of compression to spring 39 so that the nut 24 will slip at a desired resistance imposed by the work upon the tool.

During the forward feeding of the spindle, i. e. during the leftward movement of the tool structure K, any opposition to the regular feeding of the tools, over and above a predetermined amount, results in the pressure of the nut 24 toward the right in Figures 2 and 4, so that the nut becomes disengaged from collar 37 and is no longer driven thereby. The device thus operates as a sensitive feeding structure for the tools, the feeding being determined by the action of the coil spring 39, and as the resistance is overcome, this coil spring 39 operates to advance the tool structure K until the end 24 is again driven by the collar 37. This predetermination of the pressure for release, and hence the sensitiveness of the feeding may be regulated by adjusting the screw 43.

It is obvious that the invention is not limited solely to the form of construction, nor to the dimensions of parts or speeds shown or described, but that it may be employed in many ways within the scope of the appended claims.

Having thus described the invention, what I claim as new and desire to secure by Letters Patent, is:

1. A drilling unit including a drill, a frame, a drill supporting body reciprocable relative to said frame, a first driving motor mounted on said body, a second driving motor mounted on said frame, means for continuously actuating said motors for rotation in the same direction at successively different speeds, means for connecting said motors to the frame and body and to one another whereby the motors move the body with respect to the frame, a first limit switch for controlling the speed of movement of said second motor at a predetermined limit of feeding of the drill to the work, a second limit switch for controlling the speed of movement of said first and second motors upon a predetermined withdrawal movement of the drill with respect to the work, a third limit switch for controlling the speed of said first motor upon a predetermined initial forward feeding of the drill to the work, and means connected to the frame for controlling the actuation of said limit switches at the predetermined relative positions of the body and frame whereby to produce feeding and withdrawal movements of the body without stopping or reversing said motors.

2. A drill unit including a frame, a drill spindle, a body for supporting said spindle and reciprocable relative to said frame, a screw journalled in said body and held against axial movement relative thereto, a first motor for rotating said spindle and screw, a nut on said screw, a collar surrounding said screw and held against axial movement relative to said frame, a spring connected to the nut to move the nut into engagement with said collar, a second motor mounted on the frame for rotating said collar in the same direction as said screw, and means controlled by the position of the body relative to said frame for controlling the relative speeds of said motors.

3. A machine tool unit for a tool operative upon feeding movement, including a frame, a tool supporting body reciprocable relative to said frame, a screw member and a nut engaged with the screw member, a collar member adapted to frictionally engage said nut, one said member being journalled in and held against axial movement relative to said frame and the other said member being journalled in and held against axial movement relative to said body, independent devices for rotating said members, means controlled by the position of the body relative to said frame for controlling the relative speeds of said devices, resilient means for holding said nut and collar in engagement, and means for varying the action of said resilient means.

4. A drill unit including a frame, a drill spindle, a body for supporting said spindle and reciprocable relative to said frame, a screw journalled in said body and held against axial movement relative thereto, a first motor for rotating said spindle and screw, a nut on said screw, a sleeve surrounding said screw and bearing against said nut, a hollow shaft surrounding said sleeve and journalled in and held against axial movement relative to said frame, a second motor for rotating said hollow shaft, means on said shaft for engagement with said nut, a spring engaged with said sleeve for pressing said nut into engagement with said nut engaging means, externally accessible means for varying the action of said spring, and means controlled by the position of the body relative to said frame for controlling the relative speeds of said motors.

5. A machine tool unit for a tool operative upon feeding movement, including a frame, a tool supporting body reciprocable relative to said frame, a screw member and a nut member, one said member being connected to said frame and the other to the said body, separate electric motors as sources of power for rotating said members constantly in the same direction, means controlled by the movement of said body into different positions relative to said frame for controlling the relative speeds of said motors whereby to produce cyclic feeding and withdrawal movements of the body without stopping or reversing said motors, said controlling means including devices operating to control the motor speeds for producing in each cycle a rapid forward traverse, a slow working feed, and a withdrawal traverse, and a device for actuating said control means for initiating a new cycle.

6. A machine tool unit for a tool operative upon feeding movement, including a frame, a tool supporting body reciprocable relative to said frame, a screw member and a nut member, one said member being connected to said frame and the other to the said body, separate electric motors as sources of power for rotating said members constantly in the same direction and individually located on said frame and said body, a tool spindle on said body connected for drive by the electric motor mounted on said body, means controlled by the movement of said body into different positions relative to said frame for controlling the relative speeds of said motors whereby to produce cyclic feeding and withdrawal movements of the body without stopping or reversing said motors, said controlling means including devices operating to control the motor speeds for producing in each cycle a rapid forward traverse, a slow working feed, and a withdrawal traverse, and a device for actuating said control means for initiating a new cycle.

7. A machine tool unit for a tool operative upon feeding movement, including a frame, a tool supporting body reciprocable relative to said frame, a rotatable screw member and a rotatable nut member, one said member being connected to said frame and the other to the said body, a source of power located on said frame for continuously driving the said member which is connected to the frame in one direction and at varying speeds, a second source of power located on the body for driving the said member which is connected to the body in the same direction and at varying speeds, a tool spindle on said body connected for drive by said second source, means controlled by the movement of said body into different positions relative to said frame for controlling the relative speeds of said sources whereby to produce cyclic feeding and withdrawal movements of the body without stopping or reversing said sources, said controlling means including devices operating to control the speeds of said sources for producing in each cycle a rapid forward traverse, a slow working feed, and a withdrawal traverse, and a device for actuating said control means for initiating a new cycle.

8. A machine tool unit for a tool operative upon feeding movement, including a frame, a tool supporting body reciprocable relative to said frame, a screw member rotatable in and axially immovable relative to said body, a nut member rotatable in said frame, an electric motor for continuously rotating said screw member in one direction and at varying speeds, a clutch engageable with said nut member, resilient means to force said clutch and nut member into engagement and operating when the body is detained for permitting release of the clutch engagement by relative axial movement of said clutch and nut member, a second electric motor for rotating said clutch in said direction and at varying speeds, and means controlled by the movement of said body into different positions relative to said frame for controlling the relative speeds of said devices whereby to produce feeding and withdrawal movements of the body without stopping or reversing said devices.

9. A drill unit including a frame, a body reciprocable relative to said frame, an electric driving motor on said body, a drill spindle on said body and rotated by said motor, a screw rotatable in and axially immovable relative to said body, driving means connecting said motor and said screw to rotate the same continuously, a nut on said screw, means journalled on said frame including friction devices for frictionally engaging and rotating said nut and including a second electric motor on said frame, means controlled by the position of said body relative to said frame for cyclically controlling the relative speeds of said motors whereby to produce feeding and withdrawal movements of the body without stopping or reversing said motors and for detaining said body in a withdrawn position relative to the frame with slippage of said friction devices, and manually operable means for actuating said controlling means to initiate a cycle.

10. A machine tool unit for a tool operative upon feeding movement, including a frame, a tool supporting body reciprocable relative to said frame, two separate electric motors of which one is located on the frame and the other on the body, means for controlling the speeds of actuation of said motors and maintaining them continuously in rotation in the same direction and including a set of at least three control members and a set of control actuating members for moving said control members, one of said sets being mounted on said frame and the other set on said body, and means for connecting said motors to the frame and body and to one another whereby the motors are controlled by the interaction of said members for producing cyclically forward movements at different rates and withdrawal movements of said body relative to said frame, said connecting means including a friction device which permits slippage when the body is in withdrawn position relative to said frame, and devices interconnecting the same with said controlling means and control members for initiating a cycle.

11. A machine tool unit for a tool operative upon feeding movement, including a frame, a tool supporting body reciprocable relative to said frame, two separate driving devices of which one is located on the frame and the other on the body, a tool spindle on said body connected for drive by the driving device on said body, means for controlling the speeds of actuation of said devices and maintaining them continuously in rotation in the same direction and including a set of at least three control members and a set of control actuating members for moving said control members, one of said sets being mounted on said frame and the other set on said body, and means for connecting said devices to the frame and body and to one another whereby the devices are controlled by the interaction of said members for producing cyclically forward movements at different rates and withdrawal movements of said body relative to said frame, said connecting means including a friction device which permits slippage when the body is in withdrawn position relative to said frame, and devices interconnecting the same with said controlling means and control members for initiating a cycle.

12. A machine tool unit for a tool operative upon feeding movement, including a frame, a tool supporting body reciprocable relative to said frame, two independent electric driving motors and means for controlling the speeds of actuation of the same and maintaining them continuously in rotation in the same direction and including a set of at least three circuit control members mounted on the frame, and a set of control actuating members fixed to the body for moving said members at predetermined relative positions of said body and frame, circuit means connecting said control members and motors, and means for connecting said motors to the frame and body and to one another whereby the electric motors are controlled by the interaction of said members for producing cyclically feeding movements at different rates and withdrawal movements of said body relative to said frame, said connecting means including a friction device which permits slippage when the body is in withdrawn position relative to said frame, and devices interconnecting the same with said controlling means and control members for initiating a cycle.

13. A machine tool unit for a tool operative upon feeding movement, including a frame, a tool supporting body reciprocable relative to said frame, a first electric driving motor mounted on said body, a second electric driving motor mounted upon said frame, means for continuously actuating said driving motors in the same direction, a screw member and a nut member engaged therewith, one said member being supported on said body and the other said member on said frame, said body supported member being connected for continuous actuation by said first driving motor, and said frame supported member being connected for actuation by said second driving motor, first and second limit members mounted on said frame, a third limit member mounted on said frame, means mounted on said body for actuating said first and second limit members at the ends of predetermined feeding and withdrawal movements of the body relative to the frame and for actuating said third limit member at a predetermined intermediate point of the feeding movement, and means for connecting said electric motors to the frame and body and to one another whereby the motors are controlled by the interaction of said members for producing feeding movements at different rates and withdrawal movements of said body relative to said frame without stopping or reversing said driving motors.

14. A machine tool unit for a tool operative upon feeding movement, including a frame, a tool supporting body reciprocable relative to said frame, a first electric driving motor mounted on said body, a second electric driving motor mounted upon said frame, means for continuously actuating said driving motors in the same direction, a screw member and a nut member engaged therewith, one said member being supported on said body and the other said member on said frame, said body supported member being connected for continuous actuation by said first driving motor, and said frame supported member being connected for actuation by said second driving motor, a first limit member on said frame connected to said second driving motor for controlling the speed thereof when the body has been fed to a predetermined limit position with respect to the frame, a second limit member for controlling the speeds of said first and second driving motors when said body has been withdrawn to a predetermined position with respect to said frame, a third limit member for controlling the speed of said first driving motor when said body has been fed a predetermined distance from withdrawn position, and means on said body for actuating said limit members at the predetermined positions of said body in respect to said frame whereby to produce successively a rapid forward, a slow forward, and a rapid reverse feeding movement without stopping or reversing said driving motors.

15. A machine tool unit for a tool operative upon feeding movement, including a frame, a tool supporting body reciprocable relative to said frame, a screw member and a nut engaged with the screw member, a collar member adapted to frictionally engage said nut upon axial movement of the latter, yielding means for maintaining such engagement, one said member being journalled in and held against axial movement relative to said frame, and the other said member being journalled in and held against axial movement relative to said body, separate electric motors for continuously rotating said members in the same direction, and means controlled by movement of the body into different positions relative to said frame for selectively energizing the motors for different relative speeds, whereby the members interengage at the limit of return movement and a slippage occurs between said nut and collar member for permitting the continued rotation of both said motors.

16. A machine tool unit for a tool operative upon feeding movement, including a frame, a tool supporting body reciprocable relative to said frame, a screw member and a nut engaged with the screw member, a collar member adapted to frictionally engage said nut, one said member being journalled in and held against axial movement relative to said frame and the other said member being journalled in and held against axial movement relative to said body, independent electric motors for continuously rotating said members in the same direction, and means controlled by the position of the body relative to said frame for controlling the relative speeds of said motors, means for limiting the movement of said body relative to the frame so that the continued relative rotative movement of the members causes the nut member to move axially relative to said collar member and a slippage occurs between said nut and collar member for permitting the continued rotation of both said motors, and means operating between the nut and collar members for moving the same into engagement.

17. A machine tool unit for a tool operative upon feeding movement, including a frame, a tool supporting body reciprocable relative to said frame, a screw member and a nut engaged with the screw member, a collar member adapted to frictionally engage said nut, one said member being journalled in and held against axial movement relative to said frame and the other said member being journalled in and held against axial movement relative to said body, independent electric motors for continuously rotating said members, means controlled by the position of the body relative to said frame for controlling the relative speeds of said motors, means for limiting the return movement of said body relative to the frame so that the continued rotative movement of the members causes the nut member to move axially relative to said collar member, and resilient means for normally holding said nut and collar member in engagement whereby the axial relative movement of the members at the limit of return movement causes a release of the frictional engagement and a slippage between said nut and collar member for permitting the continued rotation of both said motors.

18. A machine tool feeding unit consisting of a frame, a tool supporting body reciprocable relative to said frame, a differential feeding mechanism consisting of two cooperative rotatable feeding members connected individually to said frame and said body, two variable speed electric motors, each motor being connected to one of said rotatable feeding members for driving the same, circuit means including control switches connected to said motors for energizing the same for rotation in the same direction but at different ratios of relative speed whereby different rates of feed in either forward or reverse directions may be obtained, means controlled by the movement of said body into different positions relative to said frame for operating the control switches to produce cyclically rapid forward, slow forward and return movement of the body, and manual means for operating the control switches to start a cycle.

19. A machine tool feeding unit consisting of a frame, a tool supporting body reciprocable relative to said frame, a screw member and a nut member, one said member being connected to said frame and the other to said body, one electric motor for driving said screw member constantly in one direction and a second electric motor for driving said nut constantly in the same direction, circuit means including control switches connected to said motors for energizing the same for rotation in the same direction but at different ratios of relative speed whereby different feed rates may be obtained, means controlled by the movement of said body into different positions relative to said frame for operating the control switches to produce cyclically rapid forward, slow forward and return movements of the body, and manual means for operating the control switches to start a cycle.

20. A drill unit adapted for single cycle operation, including a frame, a body reciprocable relative to said frame, a screw member and a nut member, one said member being connected to said frame and the other to said body, one electric motor connected to said screw member for operation in one direction only and a second electric motor connected to said nut member for operation in the same direction only, and circuit means including electrical controls for energizing the motors each for movement in a single direction and at varying relative motor speeds whereby different rates of feed and a cycle of movement of the body in forward and reverse directions may be obtained and for de-energizing one motor, the other motor being operative during such de-energization to drive both screw and nut members at the same speed for providing a dwell in the feed, and also means for operating said electric controls to re-energize said one motor to restart a cycle of movement following a dwell.

EDWARD JOSLIN KINGSBURY.